(12) United States Patent
Sultan et al.

(10) Patent No.: US 9,255,159 B2
(45) Date of Patent: Feb. 9, 2016

(54) PROCESS AND PLANT FOR MANUFACTURING POLYETHYLENE-DIENE-COPOLYMERS

(71) Applicant: Borealis AG, Vienna (AT)

(72) Inventors: Bernt-Ake Sultan, Stenungsund (SE);
Bjoern Voigt, Hisings Backa (SE);
Perry Nylander, Goeteborg (SE);
Thomas Hjertberg, Kungshamn (SE);
Kristian Dahlen, Stora Hoega (SE);
Mattias Bergqvist, Goeteborg (SE);
Martin Anker, Hisings Kaerra (SE);
Kjell Fossum, Stenungsund (SE)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 14/382,498

(22) PCT Filed: Mar. 7, 2013

(86) PCT No.: PCT/EP2013/054613
§ 371 (c)(1),
(2) Date: Sep. 2, 2014

(87) PCT Pub. No.: WO2013/132011
PCT Pub. Date: Sep. 12, 2013

(65) Prior Publication Data
US 2015/0133616 A1    May 14, 2015

(30) Foreign Application Priority Data

Mar. 7, 2012    (EP) .................................... 12158405

(51) Int. Cl.
*C08F 36/00*    (2006.01)
*C08F 210/00*    (2006.01)
(Continued)

(52) U.S. Cl.
CPC . *C08F 2/01* (2013.01); *B01J 3/008* (2013.01); *B01J 19/24* (2013.01); *B01J 19/2415* (2013.01); *C08F 2/002* (2013.01); *C08F 210/18* (2013.01); *B01J 2219/0004* (2013.01); *B01J 2219/00006* (2013.01); *B01J 2219/00038* (2013.01); *B01J 2219/00159* (2013.01); *B01J 2219/00162* (2013.01); *B01J 2219/24* (2013.01)

(58) Field of Classification Search
CPC ......... C08F 2/01; B01J 19/24; B01J 19/2415; B01J 2217/24
USPC .................................... 526/348, 335; 422/129
See application file for complete search history.

(56) References Cited

U.S. PATENT DOCUMENTS 6,596,241 B2    7/2003  Donck
7,582,709 B2 *  9/2009  Goossens et al. ............... 526/64
(Continued)

FOREIGN PATENT DOCUMENTS

EP    0647244 B2    2/2006
EP    1923404 A1    5/2008
(Continued)

*Primary Examiner* — William Cheung
(74) *Attorney, Agent, or Firm* — The Webb Law Firm

(57) ABSTRACT

The present invention provides a process for manufacturing polyethylene-diene-copolymer conducted in a plant including at least one compressor unit, at least one preheater unit downstream of the compressor unit and at least one reactor, in particular a reactor, downstream of the compressor unit and the preheater unit. The process comprising the steps of (a) feeding a first feed stream comprising ethylene into the at least one compressor unit and subsequently into the at least one preheater unit, and (b1) feeding a second feed stream including at least one diene comonomer to the first feed stream leaving the at least one preheater unit, and feeding the combined feed streams including ethylene and the at least one diene comonomer to the at least one reactor, and/or (b2) feeding a second feed stream including at least one diene comonomer to the at least one reactor at at least one location along the reactor.

15 Claims, 6 Drawing Sheets

(51) Int. Cl.
    *B01J 10/00* (2006.01)
    *C08F 2/01* (2006.01)
    *C08F 2/00* (2006.01)
    *C08F 210/18* (2006.01)
    *B01J 19/24* (2006.01)
    *B01J 3/00* (2006.01)

(56) References Cited

U.S. PATENT DOCUMENTS

| 7,834,115 | B2 | 11/2010 | Johansson et al. |
|---|---|---|---|
| 2005/0192414 | A1 | 9/2005 | Donck et al. |
| 2012/0273253 | A1 | 11/2012 | Nilsson et al. |
| 2012/0285722 | A1 | 11/2012 | Nilsson et al. |
| 2012/0305284 | A1 | 12/2012 | Nilsson et al. |

FOREIGN PATENT DOCUMENTS

| WO | 2011057925 | A1 | | 5/2011 |
|---|---|---|---|---|
| WO | 2011057926 | A1 | | 5/2011 |
| WO | 2011057927 | A1 | | 5/2011 |
| WO | WO 2011/057927 | | * | 5/2011 |
| WO | 2011128147 | A1 | | 10/2011 |

* cited by examiner

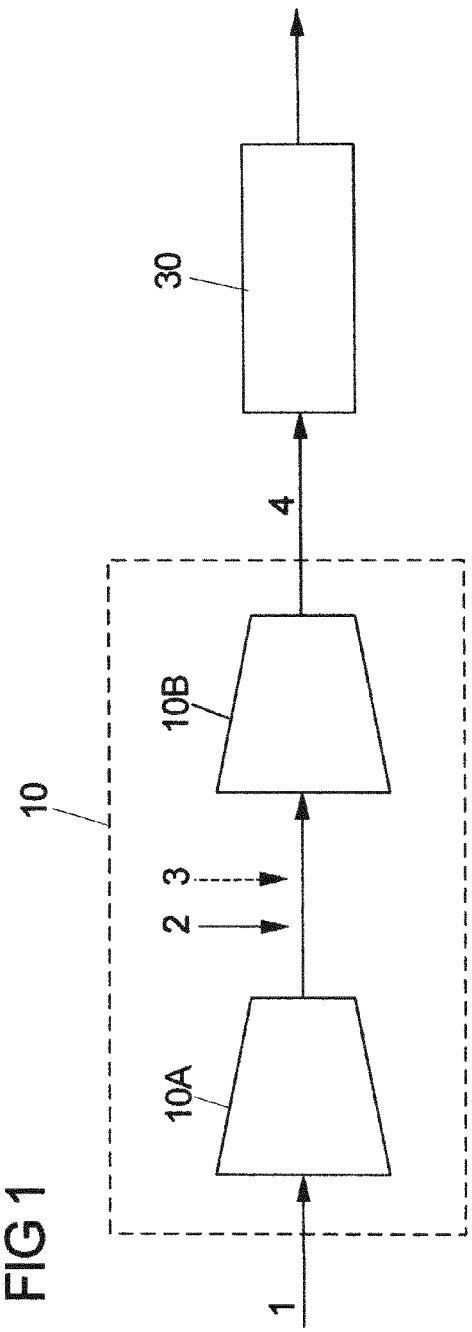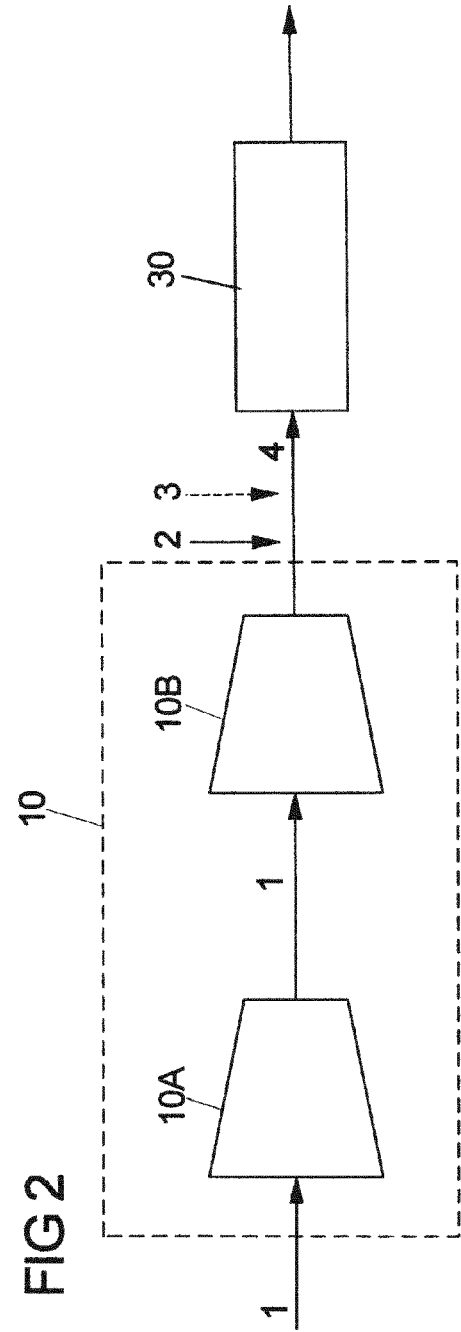

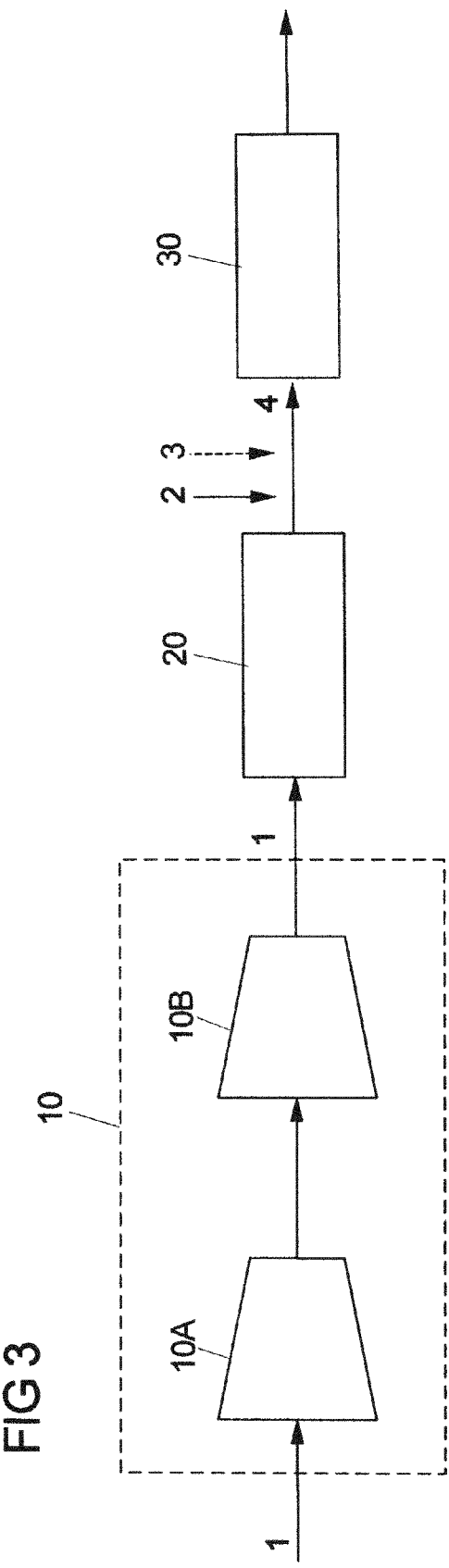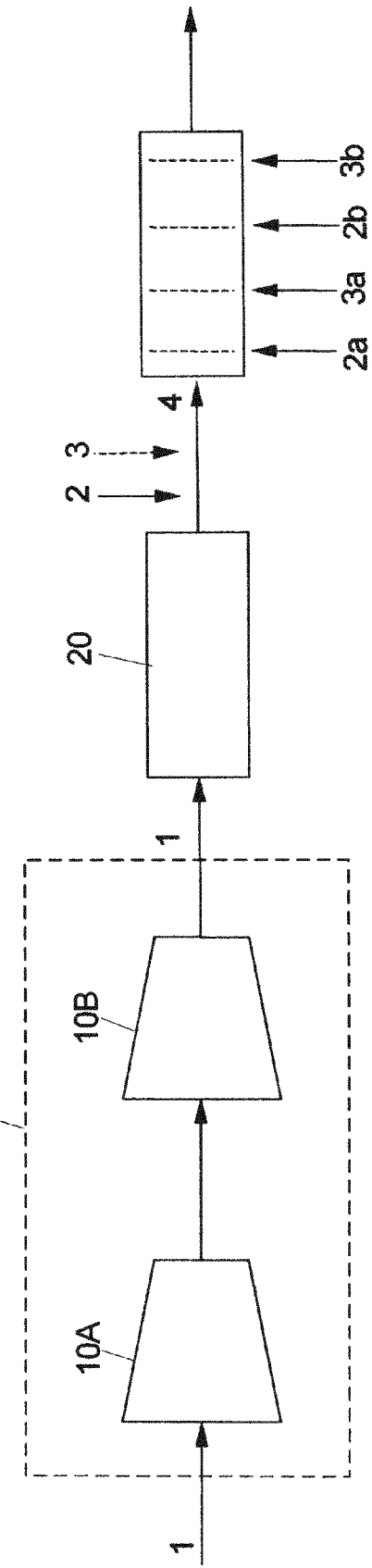

PROCESS AND PLANT FOR MANUFACTURING POLYETHYLENE-DIENE-COPOLYMERS

CROSS-REFERENCE TO RELATED APPLICATIONS

This application is the United States national phase of International Application No. PCT/EP2013/054613 filed Mar. 7, 2013, and claims priority to European Patent Application No. 12158405.6 filed Mar. 7, 2012, the disclosures of which are hereby incorporated in their entirety by reference.

BACKGROUND OF THE INVENTION

1. Field of the Invention

The present invention relates to a process for manufacturing polyethylene and a plant for conducting said process.

2. Description of Related Art

Polyethylene, in particular low density polyethylene (LDPE) is in general manufactured in a high pressure process using a tubular reactor. The exothermic polymerization reaction is carried out under operating pressures between 500 and 4000 bar and temperatures between 165 to 340° C. The polymerization of ethylene is started by free radical initiator, usually using peroxides or oxygen.

These processes are highly integrated processes requiring complex plant networks. A LDPE production plant comprises usually one or multiple compressor units for compressing the ethylene feed, a preheater for pre-heating the ethylene feed and opt. other substance, a tubular reactor for the actual polymerization process of the ethylene feed coming from the preheater, a high pressure separator (HPS) for separating the polymer monomer mixture leaving the tubular reactor and a low pressure separator (LPS) for further separation of the polymer monomer mixture. The molten polymer is then passed from the LPS to a finishing section including an extruder. The monomer phase comprising ethylene as main component is usually recycled to the ethylene feed entering the compressor units (U.S. Pat. No. 6,596,241 B1, US 2005/0192414 A1).

Low density polyethylene is characterized by a relative high number of short side chains. The short chain branches regulate the flexibility and thus density of the polymer. An increased number of short chain branches improves the flexibility and optical properties, but reduces the mechanical strength. The melt strength in turn is influenced by the molecular weight tail and number of long chain branches.

In order to regulate the molecular weight so called chain transfer agents are added to the ethylene feed. These chain transfer agents promote the transfer of a growing polymer chain to another molecule thereby reducing the average molecular weight of the final polymer.

Besides chain transfer agents comonomers can be added to the ethylene feed in order to modulate the final polymer properties. It is for instance desirable to obtain polymers having a high degree of non-saturated bonds which are available for further chemical reactions, such as e.g. introducing functional groups or for simplifying cross-linking by the use of peroxides or irradiation. Polyunsaturated compounds having at least two non-conjugated double bonds of which at least one is terminal like 1,7-octadiene or 1,9-decadiene have to be proven to be excellent comonomers for this purpose (EP 0 647 244 B2).

The ethylene feed is combined with one or more comonomers and one or more chain transfer agents before entering the compressor unit or preheater. The polymerization initiator is later added to the reaction mixture, preferably before or after the mixture has entered the tubular reactor in order to start the polymerization reaction.

It turned out that when feeding a mixture of ethylene and comonomer, in particular octadiene, to the compressor unit and subsequently to the reactor the output of octadiene-polyethylene-copolymer is reduced compared to the synthesis rate of polyethylene-homopolymer i.e. polyethylene without a comonomer. Furthermore, feeding a mixture of ethylene and comonomer to the compressor unit required also subsequently an increased polymerization initiator e.g. peroxide feed in order to maintain the output. This effect increases even further with increasing octadiene concentration as comonomer.

It furthermore turned out that when feeding a mixture of ethylene, comonomer like octadiene, and/or chain transfer agent to a preheater unit the preheater exit temperature is lower than expected and thus has a negative effect on the overall efficiency of the whole production process. The temperature drop in the preheater is in particular caused by a prepolymerisation of the comonomer octadiene and ethylene within the preheater unit without any addition of an initiator. This prepolymerisation makes it difficult to heat up the feed to the temperatures required in the synthesis reactor for starting the polymerisation reaction.

SUMMARY OF THE INVENTION

It would be therefore desirable to provide a process and a method which avoids these problems and increases the overall efficiency while simultaneously obtaining a polymer product, in particular a copolymer with the desired properties.

According to an exemplary embodiment of the invention a process for manufacturing polyethylene-diene-copolymers is provided, which is conducted in a plant comprising at least one compressor unit, at least one preheater unit and at least one reactor being downstream of the compressor unit and the preheater unit.

The process comprises the steps of
a) Feeding a first feed stream comprising ethylene into the at least one compressor unit and subsequently into at least one preheater unit,
b1) Feeding a second feed stream comprising at least one diene comonomer to the first feed stream leaving the at least one preheater unit, and feeding the combined feed streams comprising ethylene and the at least one diene comonomer to the at least one reactor, and/or
b2) Feeding a second feed stream comprising at least one diene comonomer to the at least one reactor at at least one location along the reactor.

According to the present process the ethylene and diene comonomer are not fed together to the compressor unit and the preheater unit, but rather separately. More precisely, only ethylene is fed to the compressor unit and the preheater unit and is only mixed with the diene comonomer after leaving the compressor unit and preheater unit and before entering the reactor. The diene comonomer is preferably injected into the ethylene feed stream leaving the preheater unit and before entering the reactor.

It is also conceivable to inject the diene comonomer directly into the reactor, for instance by using high pressure injection pumps, that means ethylene and diene comonomer are not fed together as a mixture into the reactor but rather separately and in parallel.

The combined feed stream of ethylene and diene can enter the reactor, in particular a tubular reactor, at the side thereof, which is transverse to the longitudinal side of the reactor. This means the combined feed stream is fed to the reactor as front feed.

Avoiding pre-mixing of ethylene and diene comonomer during the compression and preheating step provides surprisingly an increased output of ethylene-diene-copolymer. Furthermore, no increased amount of polymerisation initiator compared to the ethylene-homopolymer is required in order to retain the reactor output ethylene-diene-copolymer on the same level as ethylene-homopolymer output. A further advantage of the present process is a reduced risk of contamination of the process equipment for example the piping and preheater, of which fouling, i.e. deposition of a polymeric layer inside the preheater, is one example.

In the present process the first feed stream comprising ethylene is fed into at least one preheater unit after leaving the compressor unit. Subsequently, the second feed stream comprising the at least one diene-comonomer is fed to the first feed stream, which leaves the at least one preheater unit. Thus, the comonomer is solely added to the ethylene feed after said ethylene feed has been preheated. A preheating of an ethylene-diene-mixture before entering the reactor is avoided. It is conceivable that the preheater unit consists of one or more than one vessel or sub-units, preferably at least two subunits.

In an exemplary embodiment of the present process the ethylene of the first feed stream may come from different sources and may be pure or mixed with other components. Ethylene used may be pure fresh ethylene, ethylene recycled from the reactor without any further purification and/or ethylene recycled from the reactor which underwent gas purification before re-entering the compressor unit and thus the synthesis cycle.

According to the present process at least one diene comonomer is additionally fed to the reactor at at least one location along the reactor. The concentration of the diene comonomer being fed at a location along the reactor can thereby be the same or differs from the concentration of the diene comonomer entering the reactor as front feed.

In an exemplary embodiment of the present process the concentration of the diene comonomer being fed at front of the reactor or at a location alongside the reactor the reactor is more than 50 wt %, preferably more than 75% of the concentration of the diene comonomer entering the reactor.

It is preferred that the at least one diene comonomer, if fed to the reactor at the front and or a location along the reactor, is added to the reactor using at least one high pressure plunger pump, in particular of the type of LEWA plunger pumps.

In a further exemplary embodiment of the present process a third feed stream comprising at least one chain transfer agent is fed to the combined feed streams comprising ethylene and the at least one diene comonomer before entering the at least one reactor. Thus, ethylene, comonomer and chain transfer agent are only mixed shortly before entering the polymerisation reactor. It is also possible to add the chain transfer agent to the ethylene feed prior to the compressor unit and/or between compressor unit and preheater unit.

In another preferred embodiment at least one chain transfer agent is additionally fed into the reactor at at least one location/position along the reactor, i.e. a chain transfer agent which might be the same or different as the one mixed with the ethylene and the diene comonomer before fed to the reactor, is introduced at any suitable position, preferably via an injection valve, along the reactor into the reaction mixture inside of the reactor.

In the context of this embodiment it is furthermore preferred that the concentration of the chain transfer agent being fed at a location along the reactor is the same or differs from the concentration of the chain transfer agent, in particular in the combined feed stream, entering the reactor as front feed. It is also possible that the concentration of the chain transfer agent in the streams fed along the reactor differs in each stream. Thus, each of the chain transfer agent containing streams fed to the reactor either as front feed or at one of the injection points alongside the reactor may have different chain transfer agent concentrations. This allows for a precise regulation of the chain transfer agent concentration along the reactor wall of the reactor.

The chain transfer agent is preferably selected from a group consisting of
 aldehydes, such as proprionaldehyde, acetaldehyde, benzaldehyde,
 alcohols, such as isopropanol, t-butanol, methanol, 2-methyl-3-buten-2-ol, ethanol,
 saturated and unsaturated hydrocarbons, such as propane, propylene, butene-1,4-methylpentane-1, isobutylene, diisobutylene, ethane, 2,2-dimethylpropane, 2-methyl-3-buten, cyclopropane, methane, benzene, butane, 2,2,4-trimethylpentane, n-hexane, isobutane, n-heptane, cyclohexane, methylcyclohexane, propylene, n-decane, cyclopentane, n-tridecane, toluene, isobutylene, diisobutylene, 4-methylpentene-1, p-xylene, buten-2, buten-1, octene-1,2,methylbutene-2, cumen, 2-methylbutene-1, ethylbenzene, n-hexadecene, 3-methylbutene-1,2-ethylhexene-1,
 compounds comprising an ether, a keto group or a carboxyl group such as methyl ethyl ketone, ethylene oxide, vinyl-methyl-ether, methylacetate, t-butyl-acetate, methyl formate, ethyl acetate, methyl benzoate, ethyl benzoate, dimethoxymethane, n-butyl acetate, acetic anhydride, n-butyl benzoate, acetone, methyl butyrate, N,N-dimethylformamide, tetrahydrofuran, p-dioxane, 2-butanone, 3-methyl-2-butanone,
 compounds comprising other functional groups such as methyl vinyl sulfide, n-butyronitrile, tetramethylsilane, sulfur hexafluoride, perfluorpropane, dimethyl sulfoxide, triphenylphosphine, methylamine, N,N-diisopropylacetamide, 1,2-dichloethane, acetonitrile, N-ethylacetamide, N,N-diethylacetamide, 4,4-dimethylpentene-1, trimethylamine, N,N-dimethylacetamide, n-butyl isocyanate, n-butyl amine, diethyl sulfide, trimethylamine, 1-bromo-2-chlorethane, n-butyl isothiocyanate, methyl-3-cyanopropionate, tri-n-butylamine, isobutyronitrile, di-n-butylamine, methyl chloroacetate, 1,2-dibromoethane, dimethylamine, chloroform, 1,4-dichlorobutene-2, tri-n-butylphosphine, di-n-butyl-phosphine, dimethylphosphine, methyl cyanoacetate, carbon tetrachloride, bromotrichloromethane, phosphine,
 hydrogen, and mixtures thereof.

The use of propionaldehyde, propylene, propane, methyl ethyl ketone, hydrogen and isopropanol as chain transfer agent is in particular preferred.

In a further preferred embodiment at least one additional comonomer is fed to the combined feed stream comprising ethylene and diene comonomer downstream of the preheater unit and upstream of the polymerisation reactor. It is also possible to add the additional comonomer to the compressor unit, in particular between primary and secondary (hyper) compressor and/or between compressor unit and preheater unit.

In another preferred embodiment at least one additional comonomer is fed into the reactor at at least one location along the reactor. Within the frame of this embodiment it is also possible that the concentration of the additional comonomer being fed at a location along the reactor is the same or differs from the concentration of the additional comonomer entering the reactor. It is also possible that the concentration of the additional comonomer in the streams fed along the reactor differs in each stream. Thus, each of the additional comonomer containing streams fed to the reactor either as front feed or at one of the injection points alongside the reactor may have different additional comonomer concentrations. This allows for a precise regulation of the additional comonomer concentration along the reactor wall of the reactor.

The diene comonomer is preferably selected from a group consisting of a polyunsaturated compound having an unsubstituted carbon chain free of heteroatoms with at least 8 carbon atoms an at least 4 carbon atoms between two non-conjugated double bonds, of which at least one is terminal, in particular an $\alpha,\omega$-diene like 1,7-octadiene (OD), 1,9-decadiene, 1,11-dodecadiene, 1,13-tetradecadiene. Further suitable dienes may be selected from a group comprising functionalized dienes, siloxanes or silanes having at least two vinyl groups.

The at least one additional comonomer which may be mixed with the ethylene feed stream may be selected from a groups comprising vinyl acetate (EVA), methacrylates, in particular methyl acrylate (EMA), ethyl acrylate (EEA), butyl acrylate (EBA), ethyl-hexyl acrylate, methyl methacrylate (EMMA), acrylic acid (EAA), methacrylic acid (EMAA), glycidyl methacrylate (GMA), n-butyl methacrylate, 2-ethylhexyl methacrylate, methyl methacrylate, hydroxyethyl methacrylate, hydroxypropyl methacrylate, N,N-dimethylaminoethyl methacrylate, t-butylaminoethyl methacrylate, cyclohexyl methacrylate, 3-hydroxy-4-carbomethoxy-phenyl methacrylate, vinyl trimethoxy silane (VTMS), vinyl triethoxy silane (VTES), vinyltrimethylsilane, vinyl methyl sulfide, vinyl methyl ether, vinyl phenyl ether, vinyl butyrate, crotonic acid, maleic acid, maleic anhydride (MAH), acrylonitrile, fumaronitrile, N,N-dimethylacrylamide, N-isopropylacrylamide, N-butylacrylamide, N-phenylacrylamide, acrylamide, methacrylamide, N-ethylmaleimide, halo-olefins such as vinyl fluoride, vinyl chloride, tetrachloroethylene, vinyldibutylphosphine, N-vinylcarbazole, carbon monoxide, gamma-metha acryloxy propyl trimethoxy silane and gamma-metha acryloxy propyl triethoxy silane.

The preferred additional comonomers are selected from the group consisting of methyl acrylate, ethyl acrylate, butyl acrylate, vinyl acetate, acrylic acid, carbon monoxide, vinyl trimethoxy silane, vinyl triethoxy silane, vinyl triethoxy silane and glycidyl methacrylate.

In again a further embodiment of the process at least one polymerisation initiator is fed into the reactor as front feed and/or at at least one location along the reactor. Usually the polymerisation initiator is injected into the reactor to start the polymerization reaction at desired position or reaction zone inside the reactor.

The polymerisation initiator is preferably selected from the group of organic peroxides. Examples of suitable organic peroxides are peroxy esters, peroxy ketals, peroxy ketones and peroxycarbonates, e.g. di(2-ethylhexyl)peroxydicarbonate, dicyclohexyl peroxydicarbonate, diacetyl peroxydicarbonate, tert-butyl peroxyisopropylcarbonate, di-tert-butyl peroxide, di-tert-amyl peroxide, dicumyl peroxide, 2,5-dimethyl-2,5-di-tert-butylperoxyhexane, tert butyl cumyl peroxide, 2,5-dimethyl-2,5-di(tert-butylperoxy)hex-3-yne, 1,3-diisopropyl monohydroperoxide or tert-butyl hydroperoxide, didecanoyl peroxide, 2,5-dimethyl-2,5-di(2-ethyl-hexanoylperoxy)hexane, tert-amyl peroxy-2-ethylhexanoate, dibenzoyl peroxide, tert butyl peroxy-2-ethylhexanoate, tert-butyl peroxydiethylacetate, tert-butyl peroxydiethylisobutyrate, tertbutylperoxy-3,5,5-trimethylhexanoate,1,1-di(tertbutylperoxy)-3,3,5-trimethylcyclohexane, 1,1-di(tertbutylperoxy)cyclohexane, tert butyl peroxyacetate, cumyl peroxyneodecanoate, tert-amylperoxyneodecanoate, tert-amyl peroxypivalate, tert-butyl peroxyneodecanoate, tert-butylpermaleate, tert-butyl peroxypivalate, tert-butyl peroxyisononanoate, diisopropylbenzene hydroperoxide, cumene hydroperoxide, tert butyl peroxybenzoate, methyl isobutyl ketone hydroperoxide, 3,6,9-triethyl-3,6,9-trimethyl-triperoxocyclononane and 2,2-di(tertbutylperoxy)butane. Azoalkanes (diazenes), azodicarboxylic esters, azodicarboxylic dinitriles such as azobisisobutyronitrile and hydrocarbons which decompose into free radicals and are also referred to as C—C initiators, e.g. 1,2-diphenyl-1,2-dimethylethane derivatives and 1,1,2,2-tetramethylethane derivatives, are also suitable. It is also possible to use an initiator mix with a high temperature initiator and a low temperature initiator, which can be fed simultaneously or separately into the reactor.

The most preferred initiators are di-tert-butyl peroxide (DTBP), tert-butylperpivalate (TBPPI), tert-amylperoxy pivalate (TAPPI) and tert-butylperoxy-2-ethyl-hexanoate.

Due to the possibility of feeding of the chain transfer agent, diene comonomer, additional comonomer and/or polymerisation initiator to the reactor at least one location along the reactor different reaction zones are created within the reactor. Thus, the reactor can comprise at least two reaction zones with differences in temperature and/or reaction mixture and product concentration.

It is in general possible that the chain transfer agent and the additional comonomer are fed to the feed stream comprising ethylene before said feed stream enters the compressor unit. Thus, a feed stream comprising ethylene, chain transfer agent and an additional comonomer are fed into the compressor unit and subsequently into the preheater unit. The diene comonomer is fed to the feed stream comprising ethylene, chain transfer agent and additional comonomer after leaving the preheater unit and before entering the polymerisation reactor.

The compressor unit may comprise a primary compressor unit and a hyper or secondary compressor unit. Each of those compressor units comprises in turn a number of individual compressors, e.g. piston compressors. The primary compressor unit compresses the ethylene feed to a pressure between 50 and 300 bar, in particular 240 to 260 bar.

The pressurized ethylene is subsequently fed into the hyper or secondary compressor unit, which operates also in multiple stages such as two stages, wherein each stage comprises a number of compressors in parallel. After the first stage the ethylene feed is further pressurized to 1000 to 1400 bar, in particular 1100 to 1300 bar. Since the pressurization increases the temperature, the ethylene is cooled down before it is further pressurized by the second stage of the hyper compressor unit to pressures up to 3500 bar, in particular to 2500 to 3200 bar.

In an exemplary embodiment of the present process the preheater unit is operated at temperatures between 165 and 250° C., in particular between 165 and 200° C., and at a pressure between 1000 and 3500 bar, in particular between 2000 and 3000 bar. The reaction mixture is preheated in the preheater unit to the reaction start temperature of from about 165° C. to 200° C., and then conveyed to the reactor.

The reactor is preferably operated above the critical pressure, in particular at a pressure between 1000 and 3500 bar, more specifically between 2000 and 3200 bar, and at temperatures between 165 and 340° C., the feed temperature of the reactor being in the range of 165 to 200° C.

The reaction mixture comprising ethylene, chain transfer agent, diene comonomer, additional comonomer and initiator reacts within the reactor under formation of polyethylene copolymer. The mixture and polyethylene as product leaves the reactor at the end thereof. The polymer and the volatile part of the reaction mixture comprising mainly ethylene monomer, comonomer and chain transfer agent are subsequently separated from each other in a high pressure separator (HPS) and a low pressure separator (LPS).

The chain transfer agent and/or comonomers can further be separated from the volatile part of the reaction mixture leaving the high pressure separator and low pressure separator, in particular from the ethylene monomer in a gas purification unit. The ethylene monomer as well as the comonomer and chain transfer agent can be recycled within the present process, or alternatively may be separated by e.g. distillation and stored in a storage tank prior being reintroduced into the feed section of the compressor.

The present process previously described is conducted in a plant for manufacturing polyethylene copolymer, in particular low density polyethylene-diene-copolymer, comprising at least one compressor unit, in particular a compressor unit consisting of a primary compressor unit and a secondary compressor unit for the ethylene feed. The compressor unit is being located upstream of the reactor.

The present plant comprises furthermore at least one preheater unit for preheating the ethylene feed before entering the reactor. The preheater unit is arranged downstream of the compressor unit and upstream of the reactor. Thus, the preheater unit is located between compressor unit and polymerisation reactor. The preheater unit may comprise at least two preheater subunits.

Furthermore, it is possible to include an extra compressor unit and/or pump for each of the further feed streams containing comonomer, chain transfer agent and/or polymerisation initiator, respectively.

The at least one reactor can be a split-feed tube reactor, a front-feed tube reactor, a multi-feed tube reactor or an autoclave reactor, preferably a high pressure radical tube reactor.

In a further exemplary embodiment the plant comprises a high pressure separator (HPS) and a low pressure separator (LPS) being located downstream of the reactor. Here the polymer, in particular polyethylene-copolymer obtained in the reactor, in particular tubular reactor, and the gaseous mixture comprising ethylene monomer, chain transfer agent and comonomer are separated from each other and the polymer is sent for further work up, for example to an extruder.

The gaseous mixture is separated from waxes in a traditional dewaxing unit. The chain transfer agent and/or comonomer might be separated from each other in a gas-purification unit or recycled back to the compressor unit, in particular the secondary compressor unit.

DESCRIPTIONS OF THE DRAWINGS

The invention will be explained in more detail by the means of the following embodiments and figures.

FIG. 1 shows schematically a conventional process for manufacturing polyethylene with a primary and secondary compressor and a polymerisation reactor;

FIG. 2 shows schematically a first embodiment of the present process with a primary and secondary compressor and a polymerisation reactor;

FIG. 3 shows schematically a second embodiment of the present process with a primary and secondary compressor, a preheater and a polymerisation reactor;

FIG. 4 shows schematically a third embodiment of the present process with a primary and secondary compressor, a preheater and a polymerisation reactor;

Figure 5:
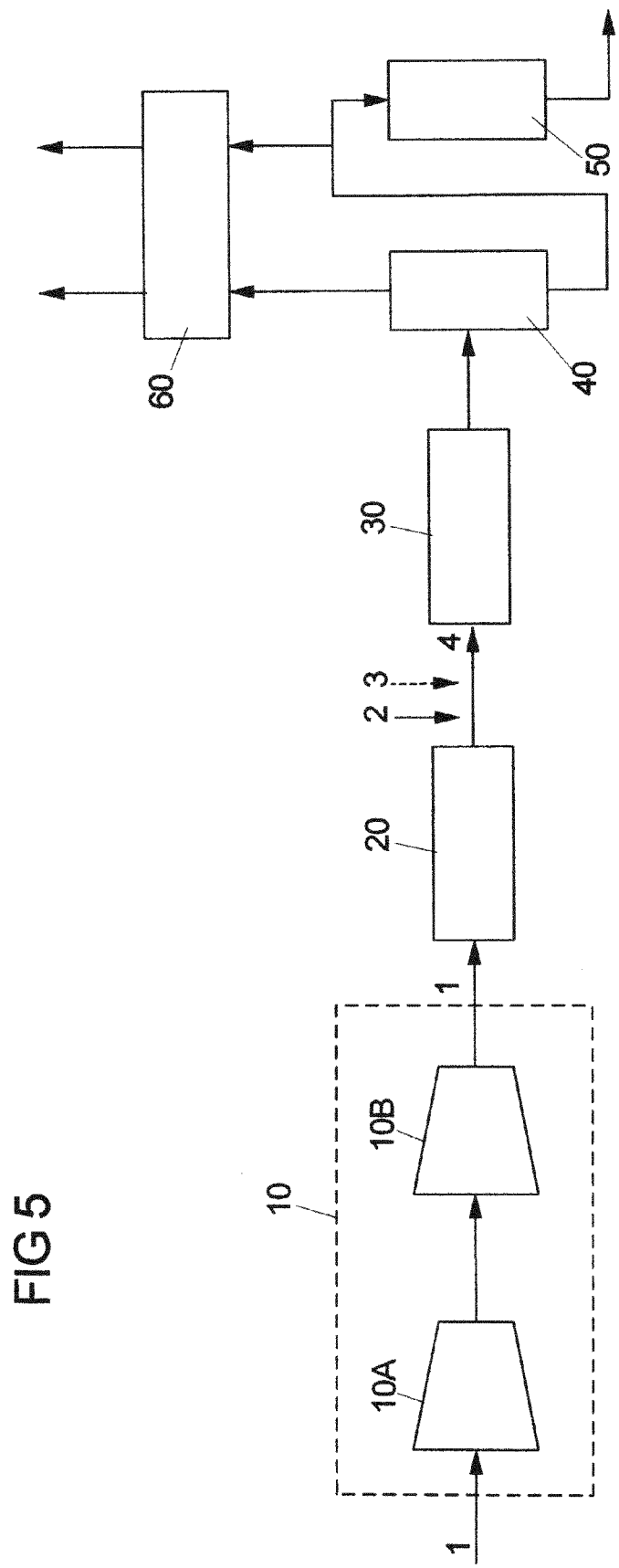
FIG. 5 shows schematically a fourth embodiment of the present process with a primary and secondary compressor, a preheater, a polymerisation reactor, a high pressure separator (HPS), a low pressure separator (LPS) and a gas purification unit.

The embodiment of FIG. 1 shows a conventional process for synthesizing a polyethylene-comonomer copolymer. Here a compressor unit 10 comprising a primary compressor 10A and a secondary compressor 10B are located upstream of the polymerisation reactor 30. In this conventional process the ethylene feed 1 enters the primary compressor 10A for being partially compressed up to a pressure between 150 and 250 bar. When leaving the primary compressor 10A the comonomer feed 2 and optionally the chain transfer agent feed 3 are added to the partially compressed ethylene feed.

The obtained mixture comprising ethylene, comonomer and chain transfer agent enters subsequently the secondary compressor 10B and is there being compressed to the pressure required in the polymerisation reactor, for example to a pressure between 500 and 4000 bar.

After leaving the secondary compressor 10B the pressurized feed 4 of ethylene, comonomer and chain transfer agent enters the reactor 30 for subsequent polymerisation. The polymerisation within the reactor is started by adding a polymerisation initiator to the reactor (not shown).

In particular when using a polyunsaturated comonomer like octadiene it has been found that octadiene itself is able to form radicals at high pressure polymerisation and high temperatures conditions as for instance in the secondary compressor 10B and in the preheater unit 20. This leads to at least a partial polymerisation already within the secondary compressor 10B before even entering the polymerisation reactor without the requirement of an initiator.

Furthermore, the octadiene radicals are able to react with the polymerisation initiator radicals within the reactor and thus terminate the initiator radicals. This leads to an reduced copolymer output and increases the required initiator concentration In order to circumvent this problem the present process offers a solution.

FIG. 2 shows a first embodiment of the present process wherein the ethylene feed 1 is also fed to a compressor unit 10 consisting of a primary compressor 10A and a secondary compressor 10B. The ethylene feed is pressurized in the compressor unit 10 up to a final pressure between 1000 and 3500 bar, in particular 2000 bar and 3000 bar for a tubular reactor and 1000 to 2000 bar for an autoclave reactor.

Only after leaving the compressor unit 10 and before entering the polymerisation reactor 30 the pressurized ethylene feed 1 is mixed with a diene comonomer feed 2 and optionally with a chain transfer feed 3. The combined feed 4 containing ethylene, diene comonomer and chain transfer agent is subsequently fed to the polymerisation reactor, where the polymerisation reaction is started by adding the polymerisation initiator (not shown).

The present process thus avoids a premixing of ethylene and diene comonomer at high pressure conditions like in the secondary compressor unit 10B. This approach increases the reactor output of copolymer by having a constant initiator feed. Thus, no increased initiator feed is required compared to the homopolymer synthesis. The comonomer radicals being formed inside the polymerisation reactor 30 are completely utilized in the polymerisation reaction.

FIG. 3 is a variation of the first embodiment. The process flow sheet is basically identical to the one of the first embodiment in FIG. 2 so that reference can be made to the previous description.

In the embodiment of FIG. 3 a preheater unit 20 is arranged downstream of the compressor unit 10 and upstream of the reactor 30. The pressurized ethylene feed 1 leaving the compressor unit 10 is preheated to a temperature between 165 and 200° C. in the preheater unit 20 which may comprise at least two preheater subunits.

Only after leaving the preheater 20 the pressurized and preheated ethylene feed 1 is combined with a diene comonomer feed 2 and a chain transfer agent feed 3. The combined feed 4 of ethylene, diene comonomer and chain transfer agent enters subsequently the reactor 30, preferably as front feed. The polymerisation reaction is started by adding the polymerisation initiator to the reactor (not shown).

In FIG. 4 a variation of the second embodiment is shown. The process flow sheet is basically identical to the previously described embodiment of FIG. 3 so that reference can be made to the previous description.

In addition to the second embodiment diene comonomer 2A, 2B and/or an additional comonomer and/or chain transfer agent 3A, 3B is injected also at various locations along the tubular reactor 30. The respective feeds are spaced lengthwise along reactor tube 30 for supplying the chain transfer agent and/or comonomer.

The comonomer 2A, 2B added additionally along the reactor tube 30 can be the same or different than the diene comonomer 2 added to the ethylene stream 1 before entering the reactor.

The chain transfer agent 3A, 3B added additionally along the reactor tube 30 can be the same or different than the chain transfer agent 3 added to the ethylene stream 1 before entering the reactor.

In FIG. 5 a further variation of the second embodiment of FIG. 3 is shown. The process flow sheet is basically identical to the one of the second embodiment in FIG. 3 so that reference can be made to the previous description.

In addition to the embodiment of FIG. 3 the plant shown in FIG. 5 comprises a high pressure separator (HPS) 40 and a low pressure separator (LPS) 50 being located downstream of the reactor 30. Here polyethylene obtained in the reactor 30 and the gaseous mixture comprising ethylene monomer, comonomer and chain transfer agent are separated from each other and the polymer is sent for further work up, for example to an extruder.

The chain transfer agent and/or comonomer are further separated from the volatile part of the reaction mixture in a gas purification unit 60. The ethylene monomer can be subsequently recycled and is sent to one of the compressor units, in particular the secondary compressor unit (not shown).

Figure 6:
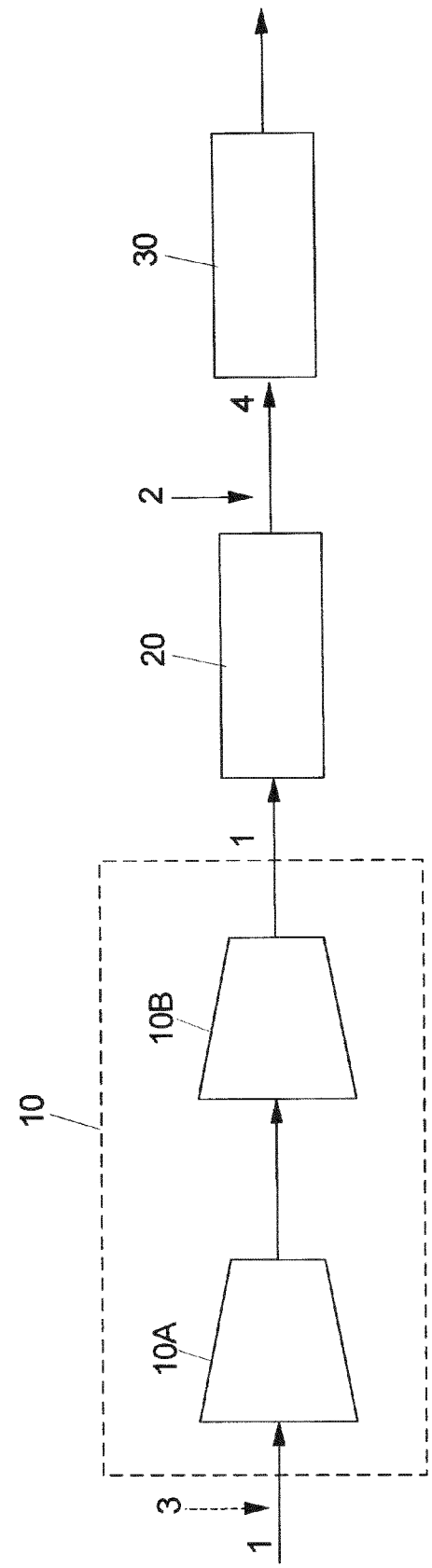
FIG. 6 shows schematically a fifth embodiment of the present process with a primary and secondary compressor, a preheater and a polymerisation reactor.

FIG. 6 is a further variation of the embodiment of FIG. 3. The process flow sheet is basically identical to the one of the embodiment depicted in FIG. 3 so that reference can be made to the previous description.

In the embodiment of FIG. 6 a preheater unit 20 is arranged downstream of the compressor unit 10 and upstream of the reactor 30.

Here the ethylene feed 1 is mixed with chain transfer agent 3 and an additional comonomer (not shown) before said stream enters the compressor unit 10. Thus, a feed stream comprising ethylene, chain transfer agent and an additional comonomer are fed into the compressor unit 10 and subsequently into the preheater unit 20. The pressurized ethylene feed 1 containing also chain transfer agent and additional comonomer leaving the compressor unit 10 is preheated to a temperature between 165 and 200° C. in the preheater unit 20 which may comprise at least two preheater subunits.

Only after leaving the preheater 20 the pressurized and preheated ethylene feed 1 containing also chain transfer agent and additional comonomer is combined with a diene comonomer feed 2. The combined feed 4 of ethylene, diene comonomer, chain transfer agent, polymerisation initiator and additional comonomer enters subsequently the reactor 30.

Figure 7:
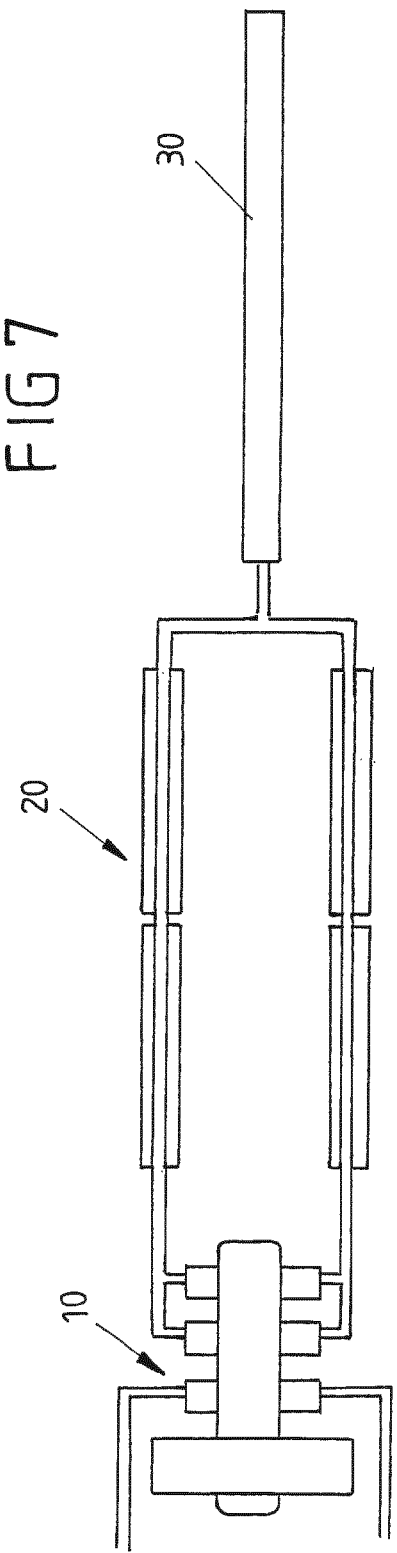
FIG. 7 shows schematically a sixth embodiment of the present process with a hyper compressor, a preheater comprising two preheater units and a polymerisation reactor.

In FIG. 7 an arrangement for a preheater unit 20 consisting of two preheater sub-units is shown. The preheater unit 20 takes its feed from the compressor units 10, in this case hyper compressor units. In FIG. 7 a configuration is shown, compressing the ethylene feed which is subsequently split into two feeds and introduced into the preheater units 20 in which the temperature of the ethylene is increased.

Figure 8:
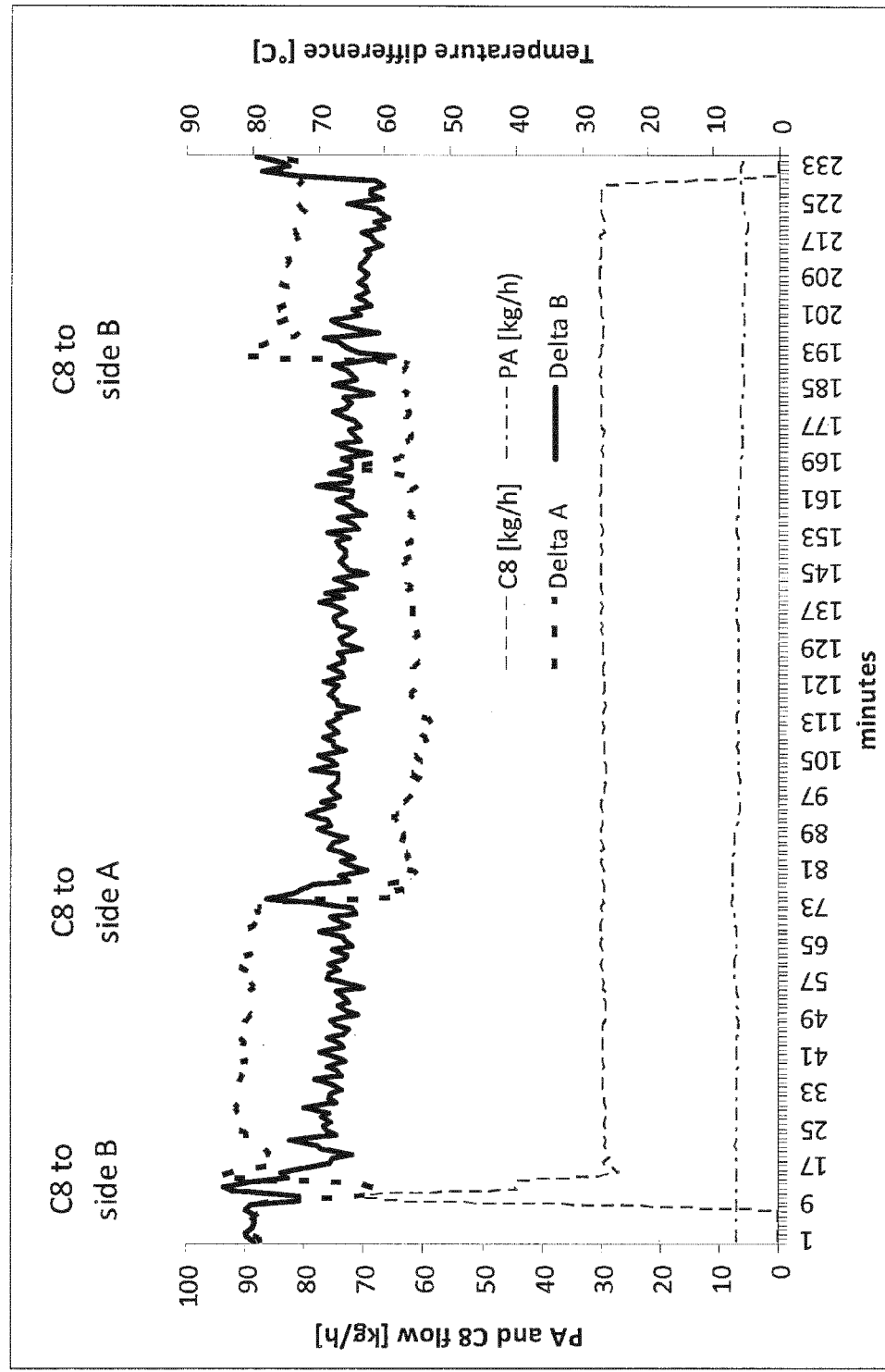
FIG. 8 shows plant data related to a performance loss in a preheater unit.

As mentioned there are two separate streams through the compressor and preheater. Thus, the two preheater units have different compositions usually called side A and Side B. This is shown in the diagram of FIG. 8, which is explained in more detail below.

EXAMPLES

In the following a comparative example in way of a conventional process and examples of the present process are described.

Example 1

Comparative Example

The reactor used in this case is a continuously 50 ml stirred tank reactor (CSTR) equipped with a jacket heating foil that can heat the reactor to at least 240° C. The ethylene is pressurised by a primary compressor up to 200 bar. In the transfer line between a primary compressor and a secondary compressor the comonomer and the chain-transfer agent are added by separate plunger pumps. The mixture is then pressurised to 2000 bar by the second compressor. The initiator (35 wt % Di-tert. butyl peroxide in heptane solution, Trigonox B) is added to the transfer between the secondary compressor and right before the polymerisation reactor. The polymer that is formed in the reactor can be collected in separate bottles at the reactor end. This allows collection of polymers produced under very specific conditions.

Experiments using the reactor of the comparative example illustrates that octadiene deactivates the peroxide. When adding a mixed pressurized feed of ethylene and 1,7-octadiene to the reactor the copolymer output was lowered by ca. 19% despite an increased initiator feed.

TABLE 1 polymerization data with/without 1,7-octadiene (97% supplied by Evonik) added prior primary compressor

| Temperature (° C.) | Ethylene (g/h) | Propionaldeyde (wt %) | 1,7-octadiene (wt %) | Initiator feed (mmol/h) | Yield (% vs ethylene feed) | Vinyl (/1000 C) |
|---|---|---|---|---|---|---|
| 235 | 1000 | 0.1 | 0 | 0.0057 | 11.0 | 0.06 |
| 220 | 1000 | 0.04 | 0.4 | 0.0079 | 9.0 | 0.48 |

Example 2

Example According to the Invention

The reactor used in this case is a continuously 160 ml stirred tank reactor (CSTR) equipped with a jacket heating foil that can heat the reactor to 150° C. The ethylene is pressurised by a primary compressor up to 250 bar and in the secondary compressor up to 2000 bar. In this reactor the comonomer and the chain transfer agent are added after the secondary compressor to the transfer line before the reactor. Separate plunger pumps were used.

The initiator mixture (t-butyl peroxypivalate, Luperox11M75, 2.1 g/dm$^3$, t-butyl peroxyacetate Luperox 7M50, 4.5 g/dm$^3$ and t-butyl peroxy-2-ethylhexanoate, Luperox 26, 5.5 g/l diluted in heptane 680 g/dm$^3$) was injected into the top and middle section of the reactor.

The polymer that is formed in the reactor can be collected in separate bottles at the reactor end. This allows collection of polymers produced under very specific conditions.

The 1,7-octadiene feed was increased from 0.4 wt % to 0.8 wt % while keeping all other reactor parameters fixed i.e. the same amount of peroxide is used. As seen in Table 2 the output increased significantly (ca. 22%).

TABLE 2

Influence of direct injection of octadiene on the total copolymer output

| Temperature (° C.) | Ethylene (g/h) | Propionaldeyde (wt %) | 1,7-octadiene (wt %) | Initiator feed (mmol/h) | Yield (% vs ethylene feed) | Vinyl (/1000 C) |
|---|---|---|---|---|---|---|
| 235 | 7854 | 0.15 | 0 | 6.4 | 11.6 | 0.05 |
| 243 | 7832 | 0.05 | 0.4 | 6.1 | 12.3 | 0.52 |
| 244 | 7797 | 0.04 | 0.8 | 6.4 | 14.1 | 0.94 |

The above data of Table 2 show that the direct feed of octadiene allows the radicals generated by the 1,7-octadiene to be used constructively in the propagation reaction rather than terminating peroxide radicals. This favours increased output and an increased content of unsaturated polymer.

Thus, the direct feed of 1,7-octadiene to the reactor improves the overall output of polymer synthesized.

Analytical Methods

Quantification of the amount of carbon-carbon double bonds by IR spectroscopy:

Quantitative infrared (IR) spectroscopy was used to quantify the amount of carbon-carbon double bonds (C=C). Calibration was achieved by prior determination of the molar extinction coefficient of the C=C functional groups in representative low molecular weight model compounds of known structure.

The amount of each of these groups (N) was determined as number of carbon-carbon double bonds per thousand total carbon atoms (C=C/1000 C) via $N=(A \times 14)/(E \times L \times D)$, wherein A is the maximum absorbance defined as peak height, E the molar extinction coefficient of the group in question (l·mol$^{-1}$·mm$^{-1}$), L the film thickness (mm) and D the density of the material (g·cm$^{-1}$).

The total amount of C=C bonds per thousand total carbon atoms can be calculated through summation of N for the individual C=C containing components.

For polyethylene samples solid-state infrared spectra were recorded using a FTIR spectrometer (Perkin Elmer 2000) on compression moulded thin (0.5-1.0 mm) films at a resolution of 4 cm$^{-1}$ and analysed in absorption mode.

A) Polymer compositions comprising polyethylene homopolymers and copolymers, except polyethylene copolymers with >0.4 wt % polar comonomer:

For polyethylenes three types of C=C containing functional groups were quantified, each with a characteristic absorption and each calibrated to a different model compound resulting in individual extinction coefficients:

vinyl (R—CH=CH$_2$) via 910 cm$^{-1}$ based on 1-decene [dec-1-ene] giving E=13.13 l·mol$^{-1}$·mm$^{-1}$, vinylidene (RR'C=CH$_2$) via 888 cm$^{-1}$ based on 2-methyl-1-heptene[2-methyhept-1-ene] giving E=18.24 l·mol$^{-1}$·mm$^{-1}$ trans-vinylene (R—CH=CH—R') via 965 cm$^{-1}$ based on trans-4-decene[(E)-dec-4-ene] giving E=15.14 l·mol$^{-1}$·mm$^{-1}$, For polyethylene homopolymers or copolymers with <0.4 wt % of polar comonomer a linear baseline correction between approximately 980 and 840 cm$^{-1}$ was applied.

B) Polymer compositions comprising polyethylene copolymers with >0.4 wt % polar comonomer:

For polyethylene copolymers with >0.4 wt % of polar comonomer two types of C=C containing functional groups were quantified, each with a characteristic absorption and each calibrated to a different model compound resulting in individual extinction coefficients:

vinyl (R—CH=CH$_2$) via 910 cm$^{-1}$ based on 1-decene [dec-1-ene] giving E=13.13 l·mol$^{-1}$·mm$^{-1}$, vinylidene (RR'C=CH$_2$) via 888 cm$^{-1}$ based on 2-methyl-1-heptene[2-methyl-hept-1-ene] giving E=18.24 l·mol$^{-1}$·mm$^{-1}$.

For poly(ethylene-co-butylacrylate) (EBA) systems linear baseline correction between approximately 920 and 870 cm$^{-1}$ was applied.

For poly(ethylene-co-methylacrylate) (EMA) systems linear baseline correction between approximately 930 and 870 cm$^{-1}$ was applied.

C) Polymer compositions comprising unsaturated low molecular weight molecules:

For systems containing low molecular weight C=C containing species direct calibration using the molar extinction coefficient of the C=C absorption in the low molecular weight species itself was undertaken.

Example 3

Comparative Example

In FIG. 7 an arrangement for a preheater unit 20 is shown. Both preheater units 20 take their feed from the compressor units 10, in this case hyper compressor units. In FIG. 7 a configuration is shown, compressing 30 t/h at 2800 bar. The compressed ethylene feed is then introduced into the preheater units 20, in which the temperature of the ethylene is increased. The heat exchange takes place using pipes comprising steam jackets. In the configuration shown in FIG. 7 steam is used to bring the ethylene to a temperature between 165 and 180° C. Therefore, this configuration comprises two steam heating units. The preheater has diameter of 39 mm and a length of 120 m. The heating is conducted using steam with 12 bar in countercurrent.

There are two separate streams through the compressor and preheater units. It means that, if the feed into the two separate streams are different, the two preheater units will have different compositions usually called side A and Side B. This is shown in FIG. 8.

It is beneficial to add reactive compounds such as chain transfer agents and/or comonomers downstream from the compressor unit 10, preferably downstream from the preheater unit 20, i.e. into the reactor 30.

In FIG. 8 the effects of fouling behavior is observed as temperature difference (delta temperature) over the preheater unit 20. Here the preheater unit 20 comprises a side A and side B, i.e. parallel tubes as shown in FIG. 7.

In FIG. 8 at three times octadiene (C8) is introduced into either side A or side B, indicated by arrows at the top of FIG. 8 Propionaldehyde (PA) is added only to side A.

At 9 minutes is octadiene added to side B. The temperature difference (see right axis in FIG. 8) over side B is dropping by 15° C. and will then slowly decrease.

At 75 minutes octadiene feed is changed to side A. The drop in delta temperature on side A is 30° C. This is due to that octadiene and propionaldehyde (PA) together increase preheater fouling.

At 193 minutes is the octadiene changed to side B. The preheater fouling on side A is reduced. The delta temperature of side A is 10° C. lower than before any octadiene was introduced on side A.

At 227 minutes is the octadiene feed stopped. Immediately the fouling is reduced. After 10 minutes both sides reach normal temperatures.

The addition of reactive substances prior sensitive process steps like e.g. compressor and preheaters might result in unwanted reactions like generation of preheater fouling and influence the lubrification of the compressor(s).

Therefore, problems in the compressor unit 10, which is mechanically very complex, are prevented if the liquid reactive feed stream(s) are pumped into the process downstream from the compressor unit 10. In the same way preheater fouling is avoided if critical substances are added after the preheater.

It is to be understood that the embodiments and examples described above are only exemplary and that any combination thereof is possible.

LIST OF REFERENCE SIGNS 1 ethylene stream
2 diene comonomer stream
2A, 2B diene comonomer/additional comonomer substreams
3, 3A, 3B chain transfer agent stream
4 combined stream after leaving the preheater unit 10A
10 compressor unit
10A, 10B compressor sub-units
20 preheater unit
30 tubular reactor
40 high pressure separator HPS
50 low pressure separator LPS
60 gas purification unit

The invention claimed is:

1. A process for manufacturing polyethylene-diene copolymer conducted in a plant comprising at least one compressor unit, at least one preheater unit downstream of the compressor unit, and at least one reactor downstream of the compressor unit and the preheater unit,
the process comprising the steps of:
a) feeding a first feed stream comprising ethylene into the at least one compressor unit and subsequently into the preheater unit, and
b1) feeding a second feed stream comprising at least one diene comonomer to the first feed stream leaving the preheater unit, and feeding the combined feed streams comprising ethylene and the at least one diene comonomer to the at least one reactor, and/or
b2) feeding another second feed stream comprising at least one diene comonomer to the at least one reactor at at least one location along the reactor.

2. The process according to claim 1, wherein the ethylene of the first feed stream is fresh ethylene, ethylene recycled from the reactor without any further purification and/or ethylene recycled from the reactor which underwent gas purification.

3. The process according to claim 1, wherein the concentration of the diene comonomer being fed at a location along the reactor is the same as or differs from the concentration of the diene comonomer entering the reactor at the front.

4. The process according to claim 1, wherein the concentration of the diene comonomer being fed at a location along the reactor is more than 50 wt %, preferably more than 75%, of the concentration of the diene comonomer entering the reactor at the front.

5. The process according to claim 1, wherein the at least one diene comonomer if fed to the reactor at a location along the reactor is added to the reactor using at least one high pressure plunger pump, in particular of the type of LEWA plunger pumps.

6. The process according to claim 1, wherein a third feed stream comprising at least one chain transfer agent is fed to the feed stream comprising ethylene before said feed stream enters the compressor unit, is fed to the combined feed streams comprising ethylene and the at least one diene comonomer before entering the at least one reactor and/or is fed to the reactor at at least one location along the reactor.

7. The process according to claim 6, wherein the concentration of the chain transfer agent being fed at a location along the reactor is the same as or differs from the concentration of the chain transfer agent, in particular in the combined feed stream, entering the reactor.

8. The process according to claim 1, wherein at least one additional comonomer is fed to the feed stream comprising ethylene before said feed stream enters the compressor unit, is fed to the combined feed streams comprising ethylene and the at least one diene comonomer before entering the at least one reactor and/or is fed to the reactor at at least one location along the reactor.

9. The process according to claim 8, wherein the concentration of the additional comonomer being fed at a location along the reactor is the same as or differs from the concentration of the additional comonomer entering the reactor at the front thereof.

10. The process according to claim 6, wherein the chain transfer agent is selected from a group consisting of proprionaldehyde, propylene, propane, methyl ethyl ketone, isopropanol, methyl vinyl sulfide, n-butyronitrile, butene-1,4-methylpentane-1, isobutylene, diisobutylene, acetaldehyde and mixtures thereof.

11. The process according to claim 1, wherein the diene comonomer is selected from a group consisting of a polyunsaturated compound having an unsubstituted carbon chain free of heteroatoms with at least 8 carbon atoms an at least 4 carbon atoms between two non-conjugated double bonds, of which at least one is terminal, in particular an $\alpha,\omega$-diene like 1,7-octadiene (OD), 1,9-decadiene, 1,11-dodecadiene, 1,13-tetradecadiene.

12. The process according to claim 8, wherein the additional comonomer is selected from a group consisting of vinyl acetate (EVA), methacrylates, in particular methyl acrylate (EMA), ethyl acrylate (EEA), butyl acrylate (EBA), methyl methacrylate (EMMA), acrylic acid (EAA), methacrylic acid (EMAA), vinyl trimethoxy silane (VTMS), vinyl triethoxy silane (VTES), glycidyl methacrylate (GMA), maleic anhydride (MAH), carbon monoxide, acrylamide, gamma-metha acryloxy propyl trimethoxy silane and gamma-metha acryloxy propyl triethoxy silane.

13. The process according to claim 1, wherein the preheater is operated at temperatures between 165 and 250° C., in particular between 165 and 200° C., and at a pressure between 1000 and 3500 bar, in particular between 2000 and 3000 bar.

14. The process according to claim 1, wherein reactor is operated above the critical pressure, in particular between 1000 and 3500 bar, more specifically between 2000 and 3200 bar, and at temperatures between 165 and 340° C., the feed temperature of the reactor being in the range of 165 to 200° C.

15. The process according to claim 1, wherein the chain transfer agent and/or comonomers are separated from the volatile part of the reaction mixture from the reactor in a gas purification unit.

\* \* \* \* \*